Patented July 17, 1928.

1,677,169

UNITED STATES PATENT OFFICE.

ALBERT C. BURRAGE, JR., OF HAMILTON, MASSACHUSETTS, ASSIGNOR, BY MESNE ASSIGNMENTS, TO ALBERT C. BURRAGE, OF BOSTON, MASSACHUSETTS.

VULCANIZATION OF RUBBER.

No Drawing.   Application filed February 8, 1924.   Serial No. 691,466.

My invention comprises an improved method of vulcanizing rubber and a vulcanizable composition, both characterized by the employment with rubber and a vulcanizing substance, of an accelerator belonging to that genus of tri-substituted guanidines having a hydrogen molecule of each amino group and also of the imino group replaced by another radical, two at least of such substitution radicals being unlike, as for example, phenyl and tolyl. Diorthotolylmonophenylguanidine and diphenylorthotolylguanidine may be instanced as specific examples of this class of tri-substituted guanidines.

The function of such accelerators is apparently catalytic, hastening the action of the vulcanizing agent with resultant improvement in the quality of the product, and while many substances having marked accelerating properties are known, not all are suitable for manufacturing purposes. For example, some such substances initiate vulcanization locally at temperatures below that of the grinding rolls so that burned spots appear in the rubber after vulcanization, some give off disagreeable or injurious fumes at the grinding-roll temperature, others produce discoloration in the rubber, while others become active only at prohibitively high temperatures.

The above genus of tri-substituted guanidines appears in general to be substantially free from the above defects and to possess in marked degree those physical properties which are requisite to effective accelerator action. Among the substances belonging to this class, diphenylorthotolylguanidine is regarded as especially desirable from a commercial standpoint on account of its ease of production from cheap and abundant raw materials. Diphenylorthotolylguanidine has the structural formula:

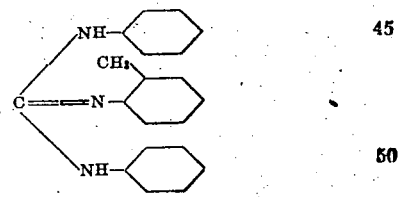

It is a white, soft, micro-crystalline powder when precipitated from its salt solutions by means of an alkali, and on account of its finely divided condition is capable of thorough and even distribution throughout the rubber by the action of the grinding rolls. Its melting point is approximately 109.2 C., which is substantially above any temperature likely to be encountered at the grinding rolls, it does not evaporate or give off injurious or disagreeable fumes at the grinding-roll temperature, and is not water-soluble or hygroscopic.

This new accelerator is combined with rubber and a vulcanizing agent such as sulphur, employing a relatively small amount of accelerator, ordinarily from one to two per cent by weight of the latter with a given weight of rubber, and the mix is then vulcanized with the aid of heat in the usual manner. The action of this new accelerator in the vulcanizing process is comparable to that of the best accelerators heretofore known, while it may be produced rapidly and at a relatively low cost.

I claim:

1. That process of vulcanizing rubber, characterized by heating rubber and a vulcanizing agent together with a tri-substituted guanidine comprising unlike aryl substitution radicals.

2. That process of vulcanizing rubber characterized by heating rubber and a vulcanizing agent such as sulphur with a tri-substituted guanidine containing both phenyl and tolyl substitution radicals.

3. That process of vulcanizing rubber characterized by heating rubber and a vulcanizing agent with a tri-substituted guanidine having a hydrogen atom of its imino group and of each of its amino groups replaced by a radical of which one at least is penhyl and another is tolyl.

4. That process of vulcanizing rubber characterized by heating rubber and a vulcanizing agent with diphenylorthotolylguanidine.

5. A vulcanizable compound comprising rubber, a vulcanizing agent and a tri-substituted guanidine containing unlike aryl substitution radicals.

6. A vulcanizable compound comprising rubber, a vulcanizing agent and a tri-substituted guanidine containing both tolyl and phenyl radicals.

7. A vulcanizable compound comprising rubber, a vulcanizing agent and tri-substituted guanidine containing two phenyl radicals and one tolyl radical.

8. A vulcanizable compound comprising rubber, a vulcanizing agent and diphenylorthotolylguanidine of the formula:

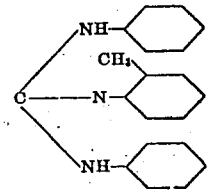

Signed by me at Boston, Mass., this thirteenth day of June, 1923.

ALBERT C. BURRAGE, Jr.